United States Patent [19]

Ozawa et al.

[11] Patent Number: 5,757,595
[45] Date of Patent: May 26, 1998

[54] APPARATUS FOR DISPLAYING BATTERY CHARGING OF ELECTRIC VEHICLE

[75] Inventors: Akira Ozawa; Toshiyuki Watanabe; Iwao Shimane; Naoki Osawa; Shinobu Ochiai. all of Wako. Japan

[73] Assignee: Honda Giken Kogyo Kabushiki Kaisha. Tokyo. Japan

[21] Appl. No.: 826,826

[22] Filed: Apr. 8, 1997

[30] Foreign Application Priority Data

Apr. 10, 1996 [JP] Japan .................................. 8-088633

[51] Int. Cl.⁶ .............................................. G08B 21/00
[52] U.S. Cl. .......................... 340/636; 340/455; 340/693; 320/48; 429/91
[58] Field of Search .............................. 340/636, 455, 340/693; 320/48; 429/90–93

[56] References Cited

U.S. PATENT DOCUMENTS

| | | | |
|---|---|---|---|
| 5,202,617 | 4/1993 | Nor | 320/2 |
| 5,283,513 | 2/1994 | Fujita et al. | 320/56 |
| 5,521,443 | 5/1996 | Imura et al. | 340/455 |
| 5,596,261 | 1/1997 | Suyama | 340/636 |
| 5,656,919 | 8/1997 | Proctor et al. | 340/636 |

FOREIGN PATENT DOCUMENTS 4-334907 11/1992 Japan .
7-087607A 3/1995 Japan .

*Primary Examiner*—Thomas J. Mullen. Jr.
*Assistant Examiner*—Daniel J. Wu
*Attorney, Agent, or Firm*—Armstrong. Westerman, Hattori, McLeland & Naughton

[57] ABSTRACT

An apparatus for displaying the charging of the battery of an electric vehicle has a charging connector mounted on an outer panel of a vehicle body of the electric vehicle, a lid openably mounted on the panel in covering relation to the charging connector and a cavity defined in the outer panel, and a display panel disposed in the cavity for displaying a period of time required until the battery is fully charged and/or a charged capacity of the battery. The driver of the electric vehicle can easily recognize the remaining time required until the battery is fully charged and a percentage of the fully charged capacity of the battery to which the battery is presently charged, from outside of the electric vehicle. The driver is not required to confirm the state of charge of the battery with an indicator on a battery charger or within the passenger's compartment of the electric vehicle, but can easily confirm the state of charge of the battery from outside of the electric vehicle.

6 Claims, 5 Drawing Sheets

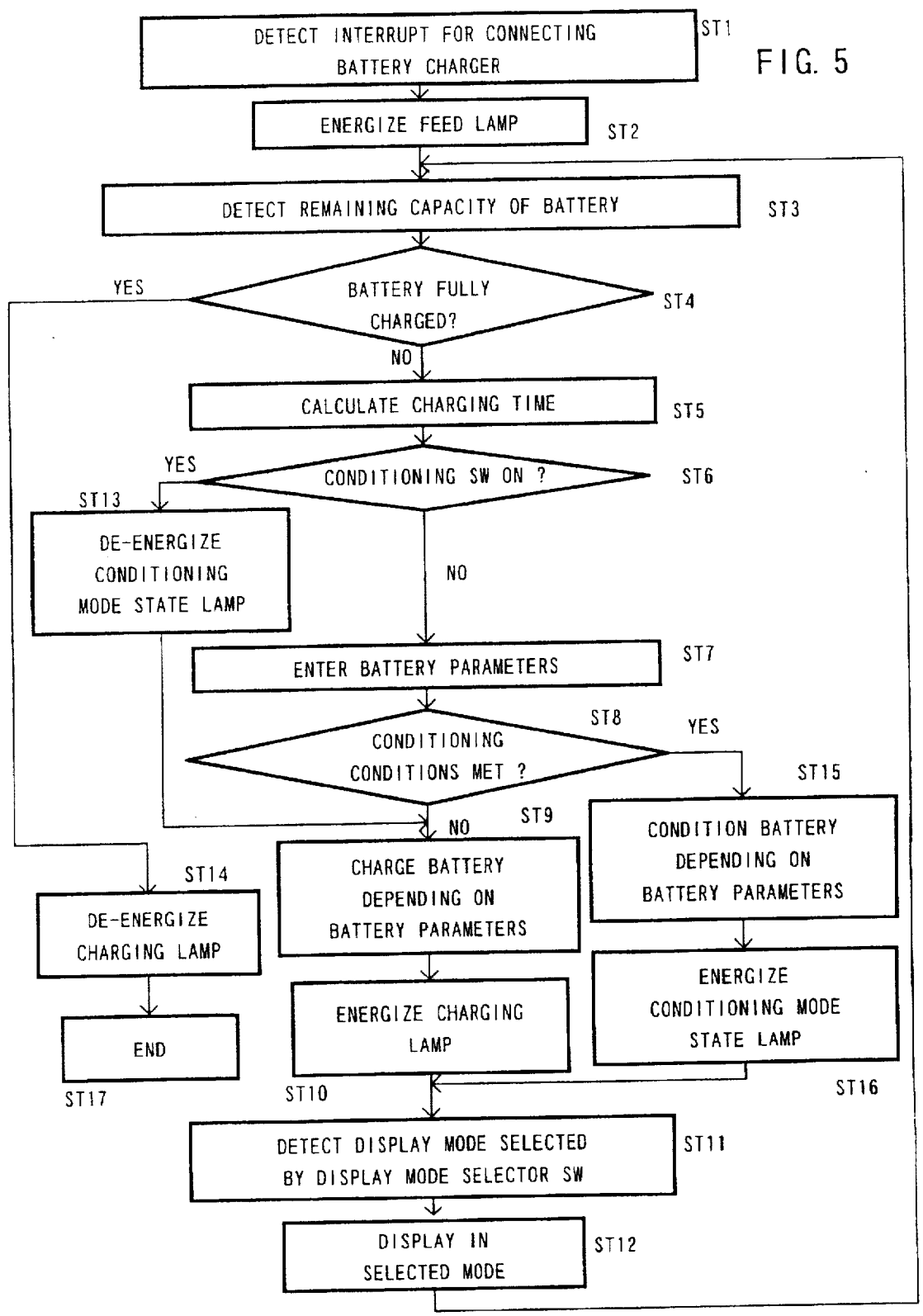

APPARATUS FOR DISPLAYING BATTERY CHARGING OF ELECTRIC VEHICLE

BACKGROUND OF THE INVENTION

Field of the Invention

The present invention relates to an apparatus for displaying the charging of the battery of an electric vehicle, and more particularly to an apparatus for selectively displaying the state of charge of the battery of an electric vehicle, a period of time that is required until the battery is fully charged, etc., while the battery is being charged by a battery charger.

Description of the Related Art

Recent years have seen much attention attracted to electric vehicles as pollution-free mobile units. Generally, electric vehicles have an electric motor as a propulsion source and a storage battery which energizes the electric motor. Since the electric motor consumes a large amount of electric energy and various other devices such as electric accessories mounted on the electric vehicle also consume a large amount of electric energy, the battery, even if it is of a large storage capacity, needs to be charged by a battery charger in a charging station especially when the electric vehicle is run over a long distance. For charging the battery, the electric vehicle has a charging connector mounted on an outer side panel of the body thereof as an electric energy feeding port for supplying electric energy to the battery, just like a fuel inlet on an automobile propelled by an internal combustion engine.

The battery on the electric vehicle is charged through the charging connector while the electric vehicle is at rest. Whether the battery is being charged or not or whether the charging process is finished or not is generally confirmed on the side of the battery charger or by an indication on an indicator mounted on an instrumental panel in the passenger's compartment of the electric vehicle (see, for example, Japanese laid-open patent publication No. 4-334907). Checking an indication on the indicator on the instrumental panel has been awkward for the following reasons: While the battery is being charged, the electric system on the electric vehicle is shut off. Therefore, after the battery is charged for a certain period of time, the electric system on the electric vehicle is turned on to enable the indicator on the instrumental panel to indicate the state of charge of the battery. If the battery has not been sufficiently charged as indicated by the indicator, then the electric system has to be turned off and the battery needs to be recharged.

Consequently, it has been customary to use an indicator on the battery charger outside of the electric vehicle for the driver to confirm whether the battery is being charged or not or whether the battery has been fully charged or not. If the battery charger or the indicator on the battery charger is positioned a substantial distance away from the electric vehicle that is being charged, then the driver is required to move from the electric vehicle to the indicator for confirming the state of charge of the battery. The driver cannot easily confirm whether the battery is being charged or not or whether the battery has been fully charged or not.

To eliminate the above drawbacks, the applicant has proposed the use of an indication device such as an indicator, a lamp, or the like located near the lid of a charging connector of an electric vehicle for indicating the state of charge of the battery on the electric vehicle thereby to enable the driver to confirm whether the battery is being charged or not or whether the battery has been fully charged or not, as disclosed in Japanese laid-open patent publication No. 7-87607.

The present invention has been made in connection with the technical concept disclosed in Japanese laid-open patent publication No. 7-87607.

SUMMARY OF THE INVENTION

It is a general object of the present invention to provide an apparatus for displaying the state of charge of the battery of an electric vehicle to enable the driver of the electric vehicle to easily recognize the state of charge of the battery from outside of the electric vehicle.

A major object of the present invention is to provide an apparatus for displaying the state of charge of the battery of an electric vehicle to enable the driver of the electric vehicle to easily confirm, from outside of the electric vehicle, whether the battery has been charged to the extent which allows the electric vehicle to run sufficiently or how much time is needed until the battery is fully charged, when the driver finds it necessary to drive the electric vehicle in the process of charging the battery.

Another object of the present invention is to provide an apparatus for displaying the state of charge of the battery of an electric vehicle to enable the driver of the electric vehicle to easily confirm a period of time required until the battery is fully charged or a charged capacity of the battery, in the process of charging the battery.

Still another object of the present invention is to provide an apparatus for displaying the state of charge of the battery of an electric vehicle to enable the driver of the electric vehicle to recognize the state of charge of the battery from outside of the electric vehicle when the driver finds it necessary to drive the electric vehicle in the process of charging the battery, by operating a selector switch to display a remaining period of time required until the battery is fully charged or a percentage of the fully charged capacity of the battery to which the battery is presently charged.

A further object of the present invention is to provide an apparatus for displaying the state of charge of the battery of an electric vehicle to enable the driver of the electric vehicle to easily determine whether the battery is being conditioned, e.g., heated or cooled, in the process of charging the battery, so that the driver can stop the charging process without error when the driver finds it necessary to drive the electric vehicle in the process of charging the battery.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a flowchart of an operation sequence of the battery charging display apparatus according to the present invention.

DETAILED DESCRIPTION OF THE PREFERRED EMBODIMENT

Figure 1:
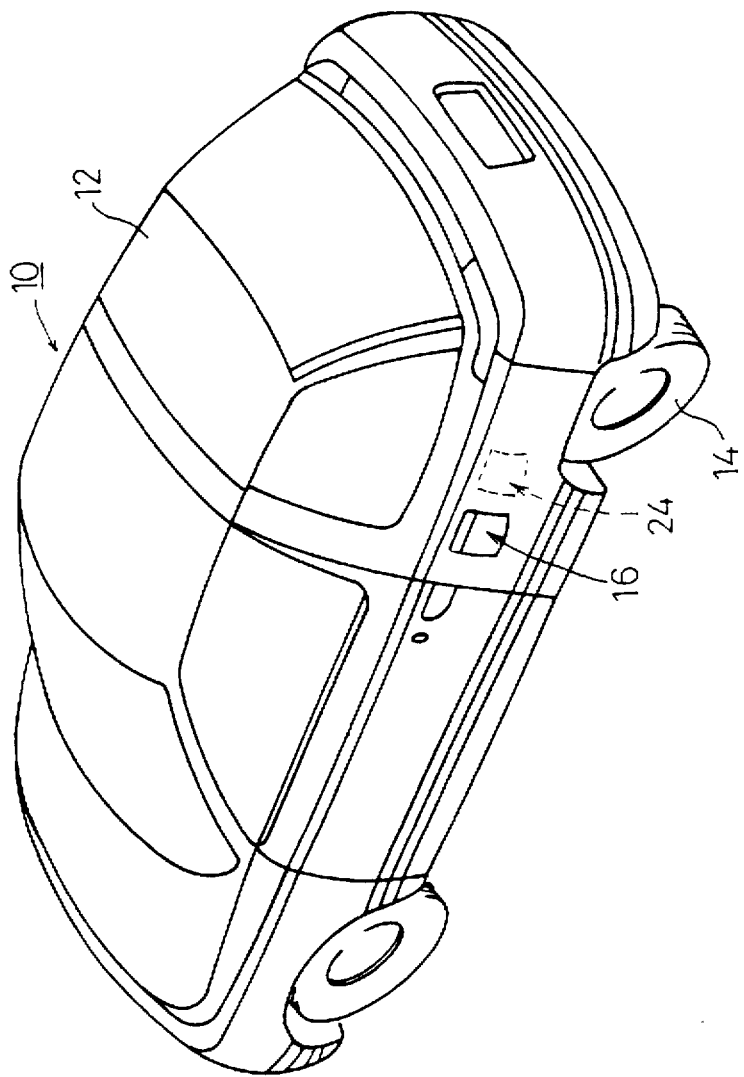
FIG. 1 is a perspective view of an electric vehicle which incorporates a battery charging display apparatus according to the present invention.

As shown in FIG. 1, an electric vehicle 10 which incorporates a battery charging display apparatus according to the present invention includes a vehicle body 12 having an electric energy feeding unit 16 on a rear outer side panel thereof near a rear wheel 14.

Figure 2:
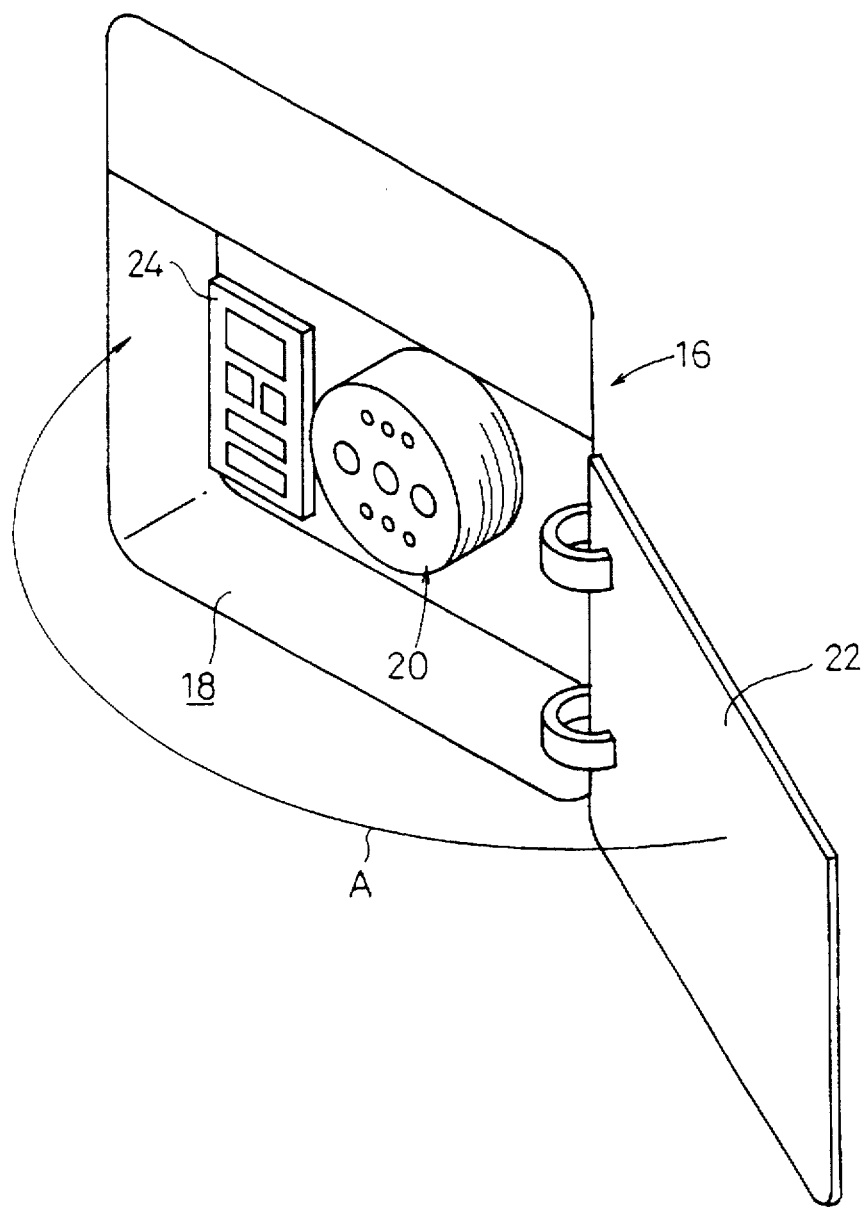
FIG. 2 is an enlarged perspective view of an electric energy feeding unit on the electric vehicle shown in FIG. 1.

FIG. 2 shows the electric energy feeding unit 16 at an enlarged scale. The rear outer side panel of the vehicle body 12 has a cavity 18 defined therein. The electric energy feeding unit 16 comprises a charging connector 20 disposed in the cavity 18. The cavity 18 is openably closed by a lid 22 which is hinged to the rear outer side panel of the vehicle body 12 for closing movement as indicated by the arrow A. The electric energy feeding unit 16 also includes a display panel 24 disposed in the cavity 18 near the charging connector 20 for displaying the state of charge of the battery on the electric vehicle 10. The display panel 24 may be disposed on an outer surface of the rear outer side panel of the vehicle body 12 near the lid 22 as indicated by the imaginary line in FIG. 1.

Figure 3:
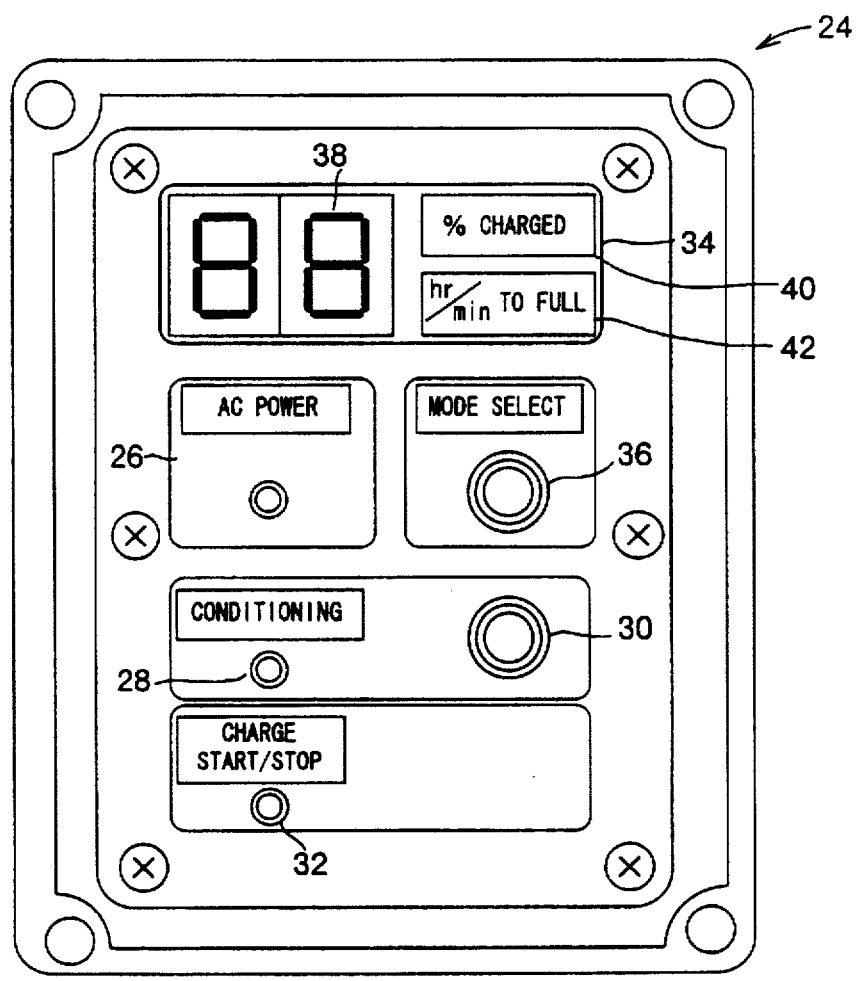
FIG. 3 is a plan view of a display panel of the electric energy feeding unit shown in FIG. 2.

FIG. 3 shows in front elevation the display panel 24 as a display means. The display panel 24 comprises a feed lamp 26 which is energized when electric energy of AC 200/100 volts is supplied to the charging connector 20, a conditioning mode state lamp 28 which is energized in either one of three conditioning modes including a heating mode for heating the battery, a cooling mode for cooling the battery after it has been charged, and a temporary charging stop mode for temporarily stopping charging of the battery, a conditioning mode state selector switch 30 for selecting a state (canceled or not canceled) of each of the conditioning modes, a charging lamp 32 which is energized in a charging mode for charging the battery and de-energized when the charging of the battery is completed, a charging indicator 34 for displaying the state of charge of the battery, and a display mode selector switch 36 for selecting a display mode of the charging indicator 34. The charging indicator 34 includes a digital display unit 38, a remaining capacity display unit 40, and a remaining charging time display unit 42.

The conditioning mode state selector switch 30 comprises a pushbutton switch for canceling the heating mode while the battery is being charged, the cooling mode after the battery is charged, or the temporary charging stop mode. For example, when the conditioning mode state selector switch 30 is pushed or turned on, the heating mode is canceled. When the conditioning mode state selector switch 30 is pushed again or turned off while the battery is being charged with the heating mode canceled, the heating mode is resumed.

Each time the display mode selector switch 36 is pushed, three display modes including a display mode for displaying a remaining capacity of the battery, a display mode for displaying a remaining time needed until the battery is fully charged, and a display mode for de-energizing display units are cycled. When the display mode for displaying a remaining capacity of the battery is selected by the display mode selector switch 36, the digital display unit 38 displays a remaining capacity of the battery as a percentage in a digital representation, and the remaining capacity display unit 40 is energized. When the display mode for displaying a remaining time needed until the battery is fully charged is selected by the display mode selector switch 36, the digital display unit 38 displays a remaining time needed until the battery is fully charged as hours or minutes in a digital representation, and the remaining charging time display unit 42 is energized.

Figure 4:
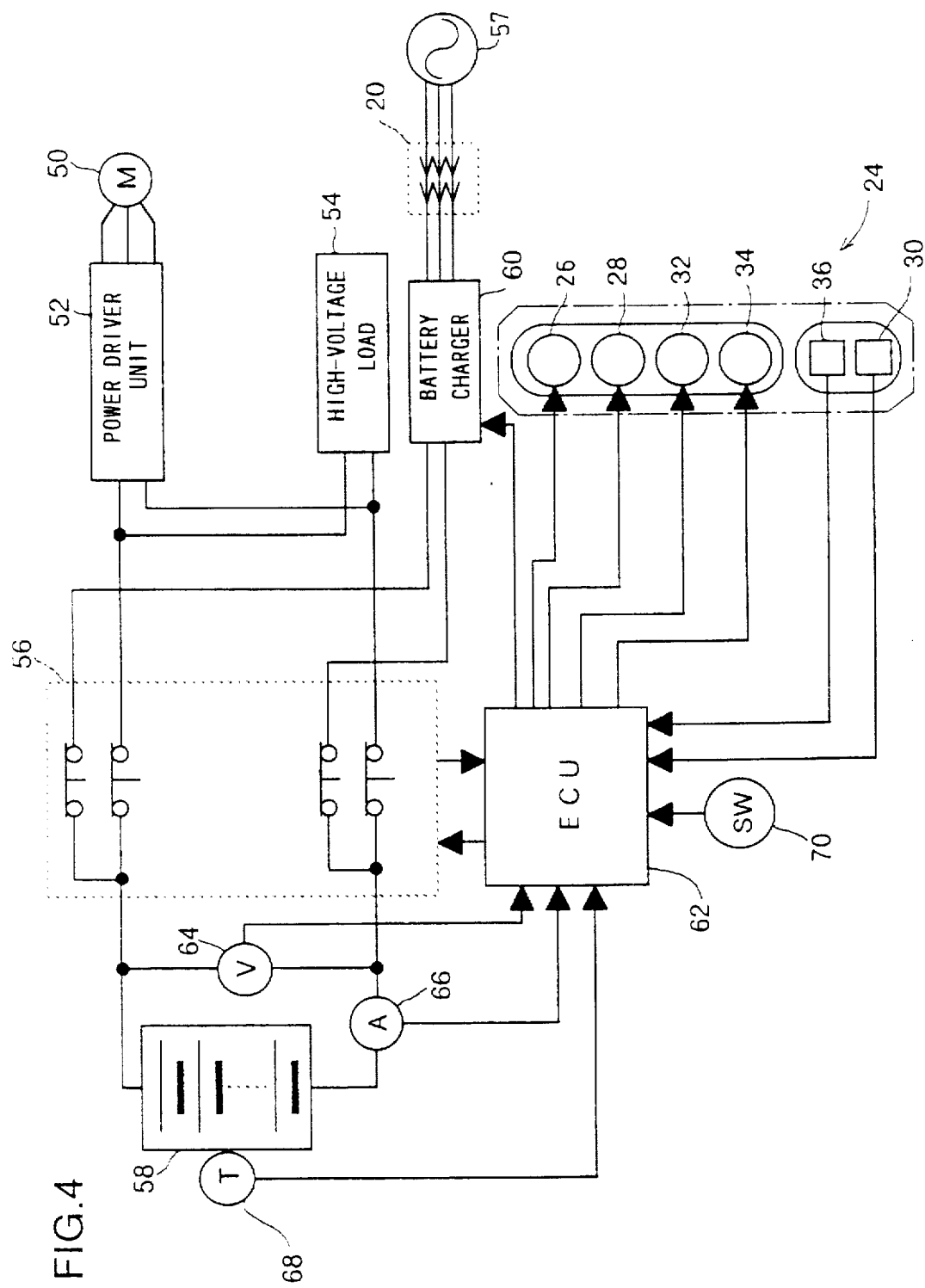
FIG. 4 is a block diagram of an electric system on the electric vehicle shown in FIG. 1.

FIG. 4 shows in block form an electric system on the electric vehicle shown in FIG. 1. As shown in FIG. 4, an electric motor 50 as a propulsion unit of the electric vehicle is connected to a power drive unit 52. The power drive unit 52 and a high-voltage load 54 on the electric vehicle are connected through a junction device 56 to a battery 58. The junction device 56 is connected through a battery charger 60 which is connected through the charging connector 20 to an AC power supply 57. The battery charger 60 is selectively connected to the battery 58 through the junction device 56.

The junction device 56 is controlled by a management ECU 62 which comprises a microprocessor. The management ECU 62 is connected to a voltmeter 64, an ammeter 66, and a temperature sensor 68 which jointly serve to detect a load on the battery 58, and controls the junction device 56 depending on the detected load on the battery 58.

The management ECU 62 is connected to a lid switch 70 for detecting whether the lid 22 is opened or closed, and the display panel 24. Depending on the states of operation of the lid switch 70, the conditioning mode state selector switch 30, and the display mode selector switch 36, the management ECU 62 controls energization of the feed lamp 26, the conditioning mode state lamp 28, and the charging lamp 32. The management ECU 62 calculates the state of charge of the battery 58 from measured values from the voltmeter 64 and the ammeter 6, and controls the charging indicator 34 to selectively display on the digital display unit 38 a remaining capacity of the battery and a remaining time needed until the battery is fully charged depending on the state of operation of the display mode selector switch 36.

Operation of the battery charging display apparatus according to the present invention will be described below with reference to FIGS. 4 and 5.

When the charging connector 20 is connected to the AC power supply 57, the battery charger 60 is connected to the AC power supply 57. The management ECU 62 detects the connection between the battery charger 60 and the AC power supply 57, and controls the junction device 56 to connect the battery charger 60 to the battery 58, starting to charge the battery 58. The management ECU 62 detects an interrupt for the connection of the battery charger 60 in a step ST1, and then energizes the feed lamp 26 in a step ST2.

Then, the management ECU 62 reads measured values from the voltmeter 64 and the ammeter 66 which are connected to the battery 58, and calculates the remaining capacity of the battery 58 as the state of charge thereof from the measured values in a step ST3. The management ECU 62 determines whether the battery 58 is fully charged or not based on the calculated remaining capacity of the battery 58 in a step ST4. If the battery 58 is fully charged, then control goes to a step ST14. If the battery 58 is not fully charged, then control proceeds to a step ST5. The calculated remaining capacity of the battery 58 may be stored in a backup memory of the management ECU 62 as an accumulated value which has been calculated by subtracting a value depending on a discharging current from and adding a value depending on a recharging current to the fully charged capacity of the battery 58 which is 100%, and the stored calculated remaining capacity may be read from the backup memory by the management ECU 62 before the battery 58 starts to be charged.

In the step ST14, the management ECU 62 de-energizes the charging lamp 32. Then, control comes to an end in a step ST17.

In the step 5, the management ECU 62 calculates the period of time required until the battery 58 is fully charged.

Then, the management ECU 62 checks the conditioning mode state selector switch 30 for its state, i.e., whether it is turned on or off, in a step ST6. Generally, the time required to charge the battery 58, i.e., the charging efficiency thereof, varies depending on the temperature of the battery 58 or the ambient temperature around the battery 58. If the temperature of the battery 58 or the ambient temperature around the battery 58 is too low, then the time required to charge the battery 58 can be shortened when the battery 58 is charged while it is being heated. After the battery 58 is charged, it is cooled. Such a process is referred to as a conditioning control process. As described above, the conditioning mode state selector switch 30 serves to cancel the heating mode while the battery is being charged, the cooling mode after the battery is charged, or the temporary charging stop mode. For example, when the conditioning mode state selector switch 30 is pushed or turned on, the heating mode is canceled. When the conditioning mode state selector switch 30 is pushed again or turned off while the battery is being charged with the heating mode canceled, the heating mode is resumed.

If the conditioning mode state selector switch 30 is turned on, i.e., if the heating mode is canceled, in the step ST6, then the management ECU 62 de-energizes the conditioning mode state lamp 28 in a step ST13, which is followed by a step ST9. If the conditioning mode state selector switch 30 is turned off, i.e., if the heating mode is not canceled, in the step ST6, then control proceeds to a step ST7.

In the step ST7, the management ECU 62 reads battery parameters required for charging of the battery 58, e.g., the remaining capacity, and the temperature and voltage of the battery 58, from a memory or the like (not shown). Then, the management ECU 62 detects the temperature of the battery 58 based on the measured value from the temperature sensor 58, and checks conditioning conditions to determine whether the battery 58 is to be conditioned or not in a step ST8. If the battery 58 is not to be conditioned ("NO" in the step ST8), then the management ECU 62 charges the battery 58 depending on the battery parameters in a step ST9, and energizes the charging lamp 32 in a step ST10. Thereafter, control goes to a step ST11.

If the battery 58 is to be conditioned ("YES" in the step ST8), then the management ECU 62 carries out the heating mode to heat the battery 58 depending on the battery parameters in a step ST15, and energizes the conditioning mode state lamp 28 in a step ST16. Thereafter, control goes to the step ST11.

In the step ST11, the management ECU 62 detects the display mode selected by the display mode selector switch 36. As described above, each time the display mode selector switch 36 is pushed, the three display modes including the display mode for displaying a remaining capacity of the battery, the display mode for displaying a remaining time needed until the battery is fully charged, and the display mode for de-energizing display units are cycled. The management ECU 62 displays the state of charge of the battery 58 on the charging indicator 34 in the detected display mode selected by the display mode selector switch 36 in a step ST12.

As described above, when the display mode for displaying a remaining capacity of the battery is selected by the display mode selector switch 36, the management ECU 62 controls the digital display unit 38 to display the remaining capacity of the battery as a percentage in a digital representation, and also energizes the remaining capacity display unit 40. When the display mode for displaying a remaining time needed until the battery is fully charged is selected by the display mode selector switch 36, the management ECU 62 controls the digital display unit 38 displays the remaining time needed until the battery is fully charged as hours or minutes in a digital representation, and also energizes the remaining charging time display unit 42.

After the step ST12, control returns to the step ST3, and the management ECU 62 repeats the steps ST3—ST12 until the full charging of the battery 58 is detected in the step ST4. When the full charging of the battery 58 is detected in the step ST4, the management ECU 62 de-energizes the charging lamp 32. Then, control is ended in the step ST17.

If a charge stop switch (not shown) is pressed when the driver finds it necessary to drive the electric vehicle in the process of charging the battery 58, or the process of charging the battery 58 is to be interrupted because of a failure of the AC power supply 57 to supply electric energy to the charging connector 20, then the management ECU 62 detects the cessation of the charging process, and controls the junction device 56 to disconnect the battery 58 from the battery charger 60 thereby stopping the charging process.

In the illustrated embodiment, the display panel 24 is shown as being disposed in the cavity 18 which houses the charging connector 20 and is openably closed by the lid 22. However, the display panel 24 may be disposed in a suitable position near the electric energy feeding unit 16 in the side panel of the vehicle body 12. The display panel 24 may simultaneously display both the time required to fully charge the battery 58 and the remaining capacity of the battery 58, which are selectively displayed in the illustrated embodiment.

According to the present invention, as described above, the driver of the electric vehicle can easily confirm a period of time needed until the battery is fully charged or a remaining capacity or charged capacity of the battery while the battery is being charged, from the display panel 24 that can be visually checked from outside of the electric vehicle. The driver is therefore not required either to sit on the driver's seat, turn the ignition key to turn on the electric system of the electric vehicle, and confirm the state of charge of the battery with an indicator on the instrumental panel, or to confirm the state of charge of the battery with an indicator on the battery charger outside of the electric vehicle. Instead, the driver can recognize the remaining time required until the battery is fully charged and a percentage of the fully charged capacity of the battery to which the battery is presently charged, from outside of the electric vehicle. As a result, the driver can easily confirm the state of charge of the battery on the electric vehicle from outside of the electric vehicle.

Even when the driver finds it necessary to drive the electric vehicle while the battery is being charged, the driver can operate the selector switch to display the remaining time required until the battery is fully charged or a percentage of the fully charged capacity of the battery to which the battery is presently charged, from outside of the electric vehicle. Therefore, the driver can easily confirm the state of charge of the battery. Furthermore, the driver can also easily recognize whether the battery is conditioned, i.e., heated or cooled, while the battery is being charged. As a consequence, the driver can stop the charging process without error when the driver finds it necessary to drive the electric vehicle in the process of charging the battery.

Although a certain preferred embodiment of the present invention has been shown and described in detail, it should be understood that various changes and modifications may be made therein without departing from the scope of the appended claims.

What is claimed is:

1. An apparatus for displaying a charging state of a battery of an electric vehicle, comprising:

a charging connector mounted in a cavity in an outer panel of a vehicle body of said electric vehicle;

a lid openably mounted on said outer panel of said electric vehicle in covering relation to said charging connector and said cavity defined in said outer panel;

display means, disposed in said cavity, for selectively displaying at least one of said charging states of a period of time required until said battery is fully charged and a charged capacity of said battery;

selecting means for selecting a display mode of said display means; and wherein said display means further comprises:

means for selectively displaying at least one of said charging states of said period of time required until said battery is fully charged and said charged capacity of said battery based on a display mode selected by said selecting means, wherein said charged capacity of said battery is displayed as a remaining capacity in a digital percentage representation;

remaining capacity display unit enerzizable when said remaining capacity of said battery is displayed as a digital percentage; and remaining time display unit energizable when said period of time required until said battery is fully charged is displayed.

2. The apparatus according to claim 1, wherein said display means includes conditioning mode state display means for displaying a conditioning mode to selectively at least one of heat and cool said battery.

3. An apparatus for displaying a charging state of said battery of an electric vehicle, comprising:

a charging connector mounted in a cavity in an outer panel of a vehicle body of said electric vehicle;

display means, mounted in said cavity in said outer panel near said charging connector, for selectively displaying at least one of said charging states of a period of time required until said battery is fully charged and a charged capacity of said battery;

selecting means for selecting a display mode of said display means; and wherein said display means further comprises:

means for selectively displaying at least one of said charging states of said period of time required until said battery is fully charged and said charged capacity of said battery based on a display mode selected by said selecting means wherein said charged capacity of said battery is displayed as a remaining capacity in a digital percentage representation;

remaining capacity display unit energizable when said remaining capacity of said battery is displayed as a digital percentage; and remaining time display unit energizable when said period of time required until said battery is fully charged is displayed.

4. The apparatus according to claim 3, wherein said display means includes conditioning mode state display means for displaying a conditioning mode to selectively at least one of heat and cool said battery.

5. An apparatus for displaying a charging state of a battery of an electric vehicle, comprising:

a charging connector mounted in a cavity in an outer panel of a vehicle body of said electric vehicle;

a lid openably mounted on said outer panel of said electric vehicle in covering relation to said charging connector and said cavity defmed in said outer panel; and display means, disposed in said cavity, for displaying any one of said charging states of a period of time required until said battery is fully charged and a charged capacity of said battery, wherein said display means comprises:

means for displaying any one of said period of time required until said battery is fully charged and said charged capacity of said battery in a digital percentage representation; and conditioning mode state display means for displaying a conditioning mode to any one of heat and cool said battery, wherein said conditioning mode state display means includes a conditioning mode state selector switch for cancelling anyone of a heating mode while said battery is being charged, a cooling mode after said battery is charged, and a temporary charging stop mode.

6. An apparatus for displaying a charging state of a battery of an electric vehicle, comprising:

a charging connector mounted in a cavity in an outer panel of a vehicle body of said electric vehicle; and display means, mounted in said cavity in said outer panel near said charging connector, for displaying any one of said charging state of a period of time required until said battery is fully charged and a charged capacity of said battery, wherein said display means comprises:

means for displaying any one of said period of time required until said battery is fully charged and said charged capacity of said battery in a digital percentage representation; and conditioning mode state display means for displaying a conditioning mode to any one of heat and cool said battery, wherein said conditioning mode state display means includes a conditioning mode state selector switch for cancelling anyone of a heating mode while said battery is being charged, a cooling mode after said battery is charged, and a temporary charging stop mode.

* * * * *